(No Model.) 5 Sheets—Sheet 1.
I. BASULTO.
MACHINE FOR MAKING HAMMOCKS.
No. 580,756. Patented Apr. 13, 1897.
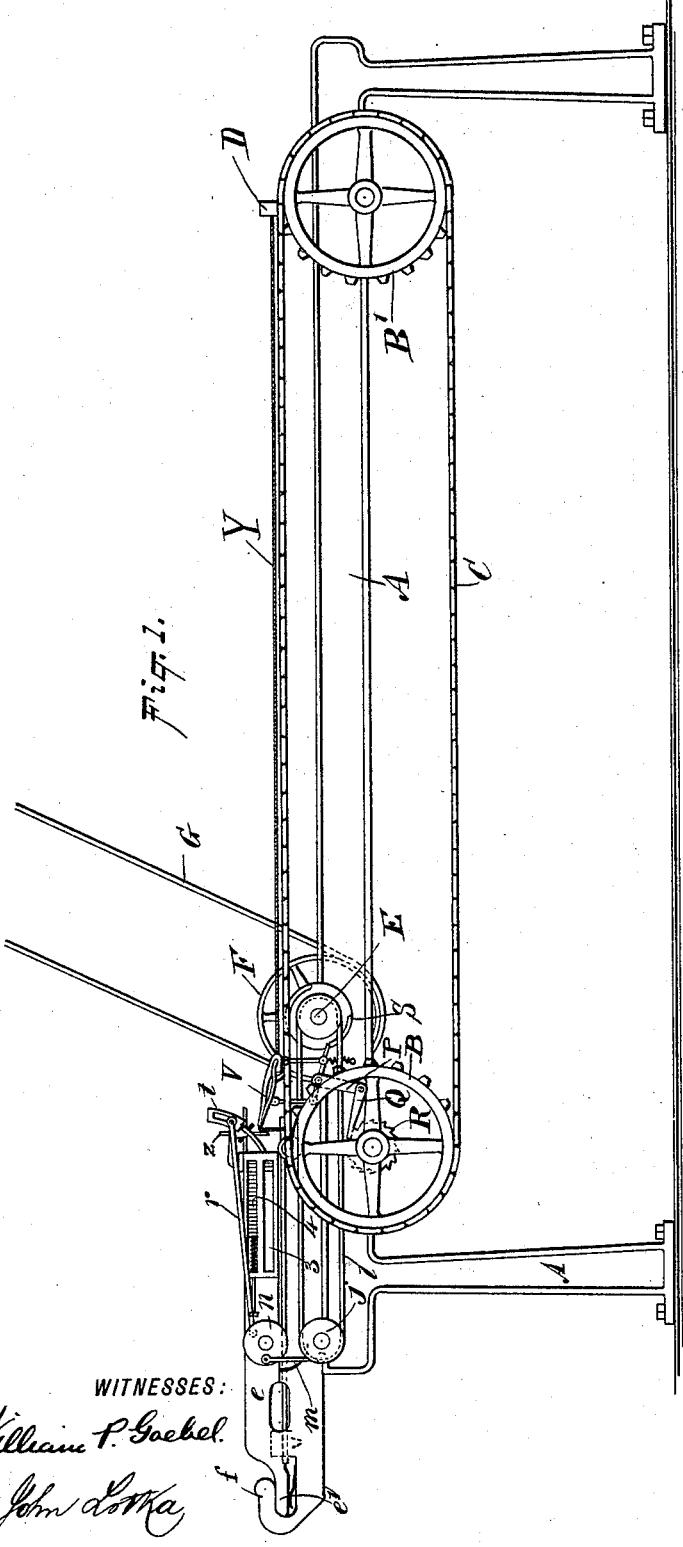
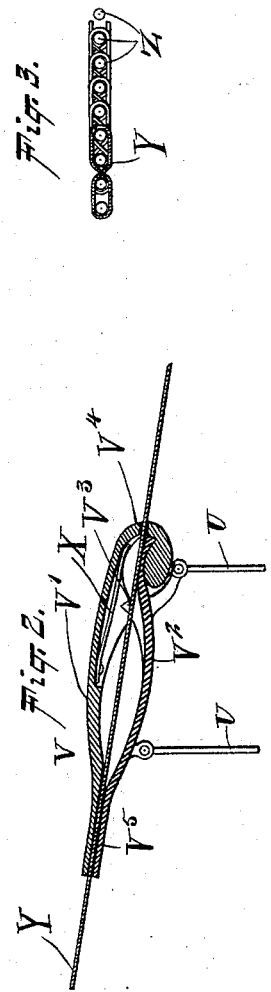
WITNESSES:
William P. Gaebel.
John Lotka
INVENTOR
I. Basulto
BY
ATTORNEYS.

(No Model.) 5 Sheets—Sheet 2.

I. BASULTO.
MACHINE FOR MAKING HAMMOCKS.

No. 580,756. Patented Apr. 13, 1897.

WITNESSES:
William P. Goebel.
John Lotka.

INVENTOR
I. Basulto
BY
ATTORNEYS.

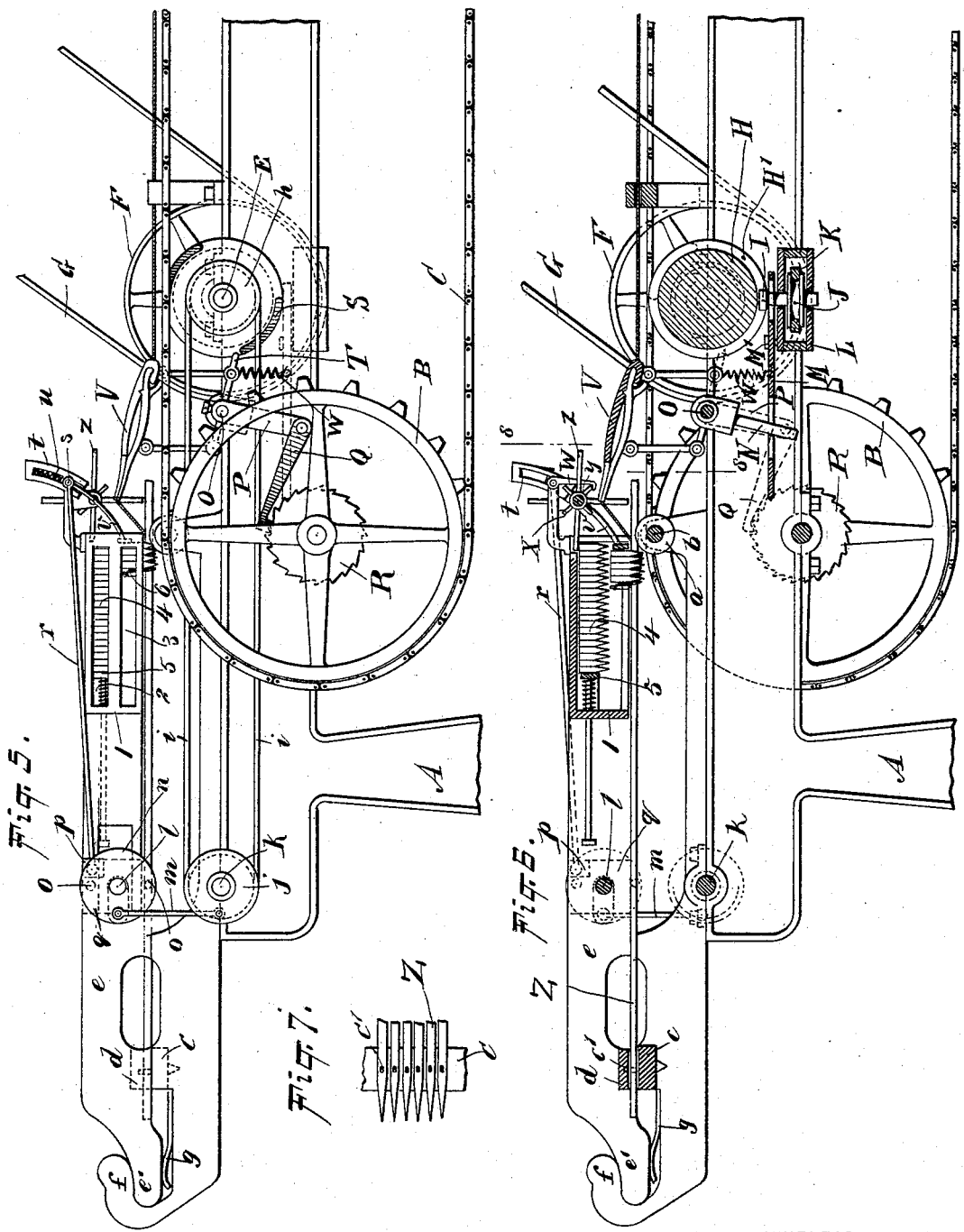

(No Model.) 5 Sheets—Sheet 4.
I. BASULTO.
MACHINE FOR MAKING HAMMOCKS.
No. 580,756. Patented Apr. 13, 1897.
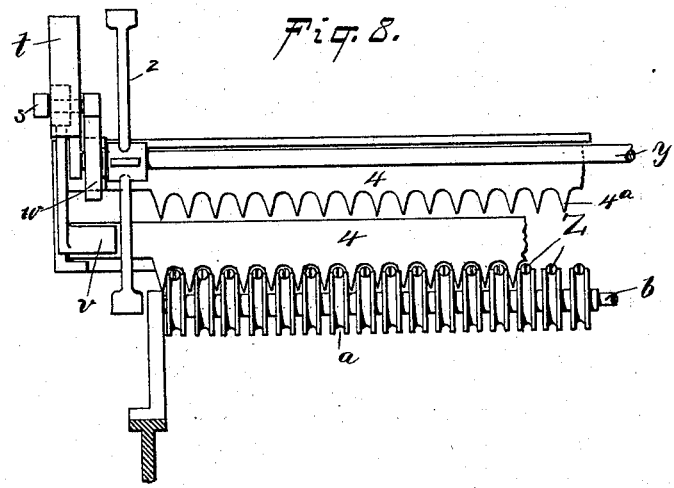
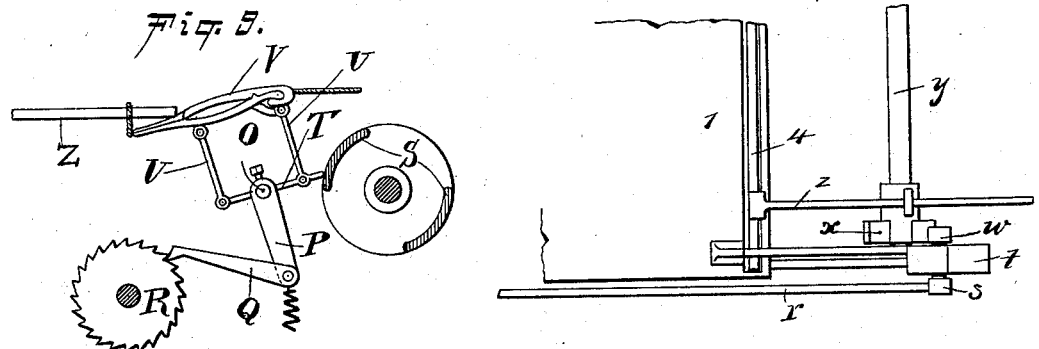
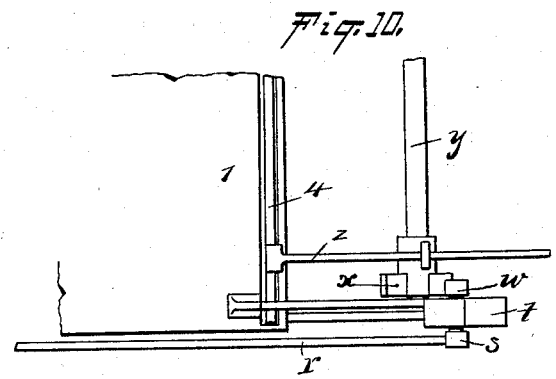
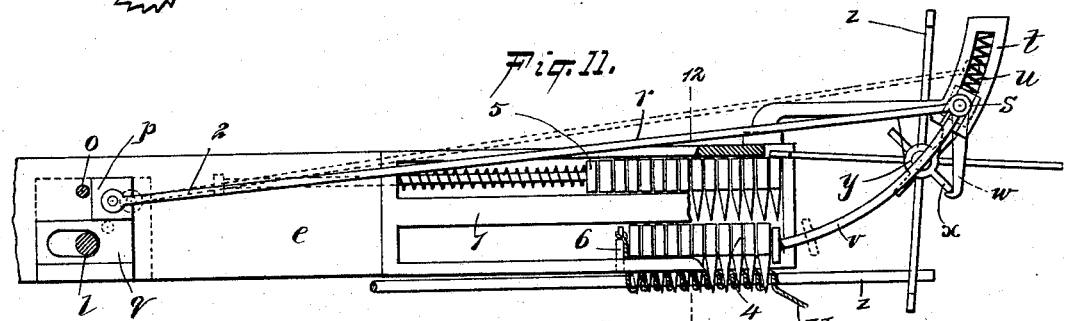
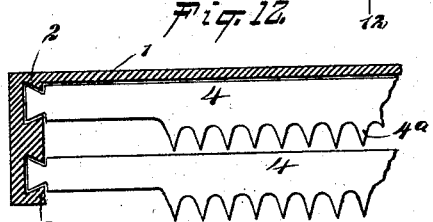
WITNESSES: William P. Goebel. John Lotka.
INVENTOR I. Basulto.
BY
ATTORNEYS.

(No Model.) 5 Sheets—Sheet 5.

I. BASULTO.
MACHINE FOR MAKING HAMMOCKS.

No. 580,756. Patented Apr. 13, 1897.

WITNESSES:
William P. Goebel
John Lotka

INVENTOR
I. Basulto
BY
ATTORNEYS.

UNITED STATES PATENT OFFICE.

IGNACIO BASULTO, OF NEW YORK, N. Y., ASSIGNOR TO HIMSELF AND ABELARDO G. DE AGUIAR, OF SAME PLACE.

MACHINE FOR MAKING HAMMOCKS.

SPECIFICATION forming part of Letters Patent No. 580,756, dated April 13, 1897.

Application filed July 22, 1896. Serial No. 600,113. (No model.)

*To all whom it may concern:*

Be it known that I, IGNACIO BASULTO, of New York city, in the county and State of New York, have invented a new and Improved Machine for Making Hammocks, of which the following is a full, clear, and exact description.

My invention relates to machines for making hammocks and the like, said machine comprising a series of needles or bars around which the thread or corresponding material is placed or wound by means of suitable movable guides, mechanism for advancing the meshes thus formed, and means for feeding the material forward, all as hereinafter described and claimed.

Reference is to be had to the accompanying drawings, forming a part of this specification, in which similar characters of reference indicate corresponding parts in all the views.

Figure 4:
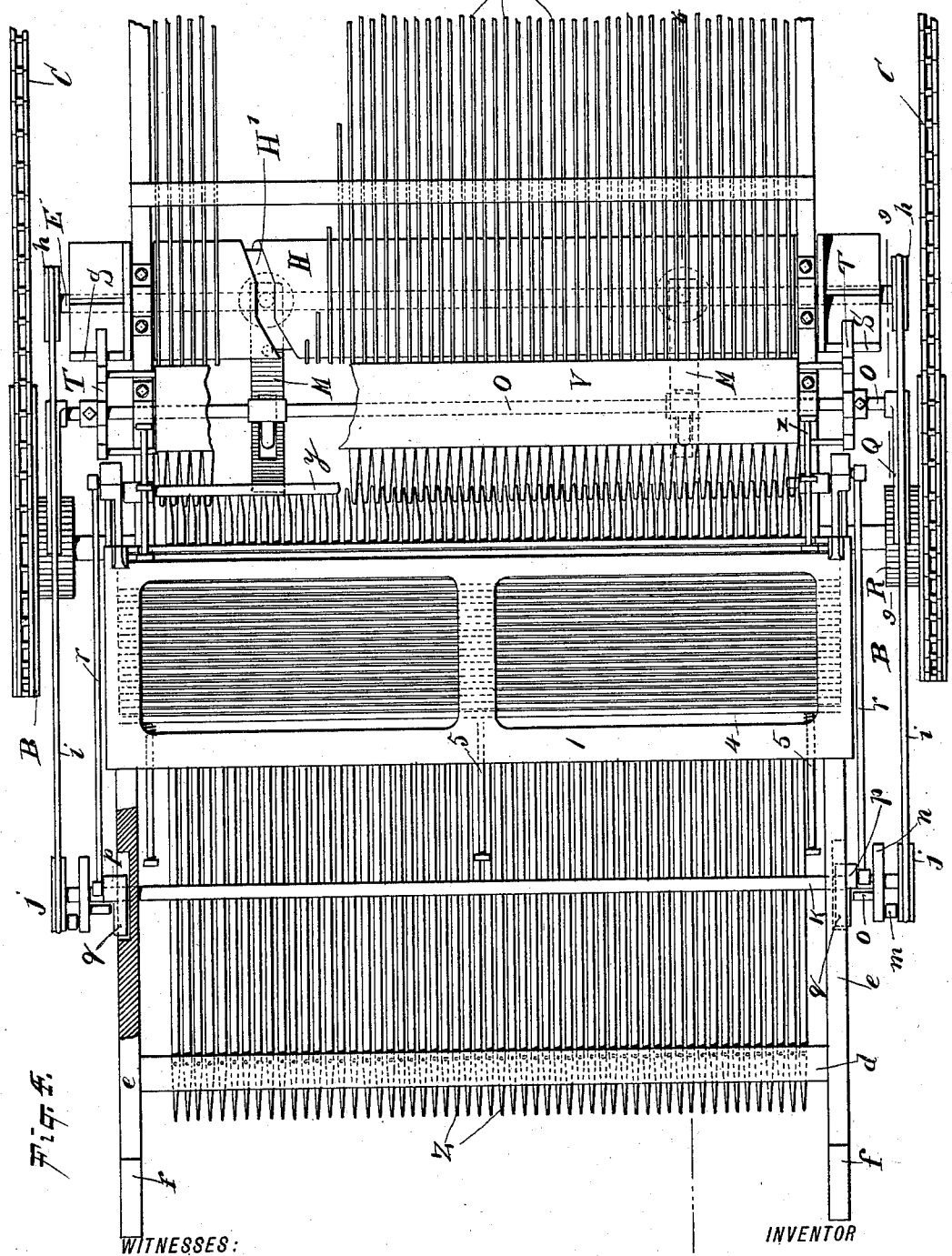
Figure 13:
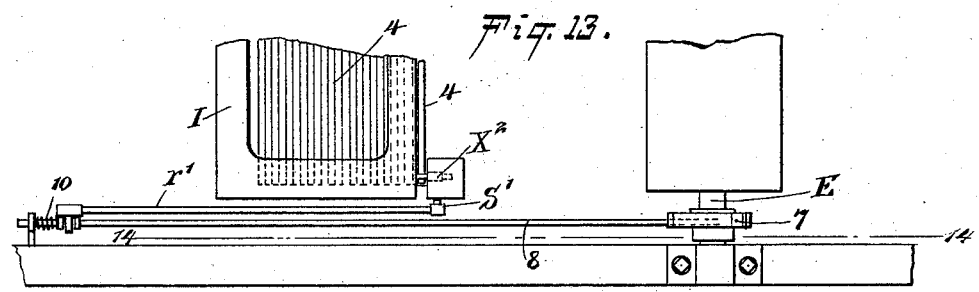
Figure 14:
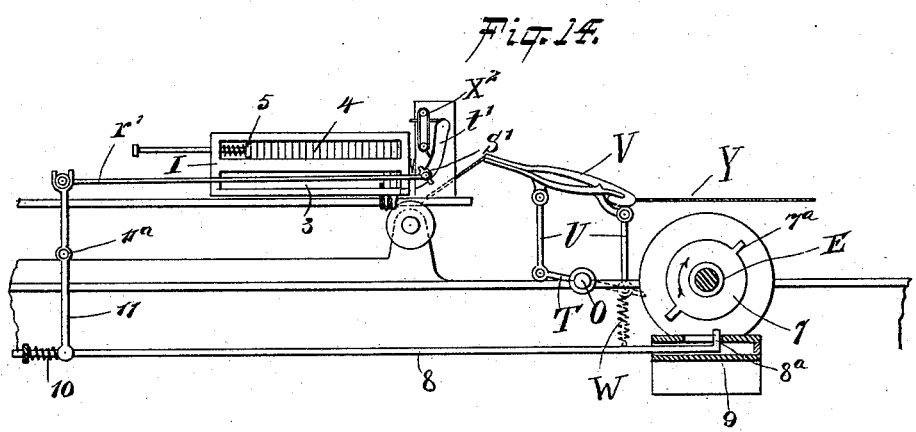
Figure 15:
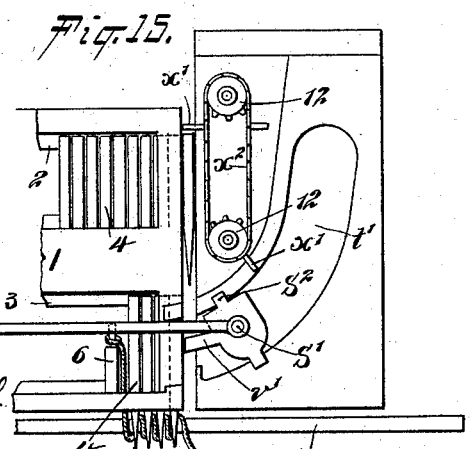

Figure 1 is a side elevation of the machine. Fig. 2 is a longitudinal section of the movable thread-guides. Fig. 3 is an end view of the needles or bars, showing the weave of the material. Fig. 4 is a plan view of one end of the machine with parts broken away. Fig. 5 is a side elevation of the same parts. Fig. 6 is a sectional elevation on the line 6 6 of Fig. 4. Fig. 7 is a detail plan view showing the means for fastening one end of the needles. Fig. 8 is a broken transverse section substantially on the line 8 8 of Fig. 6. Fig. 9 is a longitudinal section on the line 9 9 of Fig. 4. Fig. 10 is a plan view of one form of the mechanism for advancing the meshes. Fig. 11 is a side elevation of the said mechanism with parts in section. Fig. 12 is a transverse sectional elevation on the line 12 12 of Fig. 11. Fig. 13 is a plan view of another form of the mechanism for operating the mesh-advancing device. Fig. 14 is a side elevation of said device, partly in section on the line 14 14 in Fig. 13; and Fig. 15 is a broken side elevation, on an enlarged scale, of part of the mechanism shown in Fig. 14.

The improved machine comprises a suitable frame A, in which are journaled chain-wheels B B', receiving the chains C. On one of the runs of the chains is secured a clamp D, formed of two sections, each having a series of sockets spaced at regular distances apart and adapted to receive the thread in a manner fully stated hereinafter. In the frame A is also journaled the drive-shaft E, carrying a drive-pulley F, adapted to receive motion by means of a belt G or equivalent device.

On the drive-shaft E is secured a cylinder H, provided with continuous cam-grooves H', (see Fig. 4,) and each of the cam-grooves is engaged by a stud I, projecting from the shaft of the roller J, adapted to travel on a stationary guideway K, secured within a box L. Said box is transversely slotted where the axle of the wheel J passes through it, so that the said wheel may move transversely in following the cam-grooves H'. On the box L or on some other stationary part of the machine is fulcrumed a lever M, the pivot M' being vertical, as shown, and said lever is provided with two longitudinal slots at opposite sides of its fulcrum, one of said slots being engaged by the axle of the wheel J, while the other slot is engaged by an arm N, extending downwardly from a shaft O, mounted to slide transversely in the frame of the machine. On the said shaft is rigidly secured another arm P, (see Figs. 1, 5, 6, and 9,) said arm being pivotally connected to a pawl Q, adapted to engage a ratchet-wheel R, rigidly secured to the shaft of the chain-wheel B. The ratchet-wheel R is of such a width (see Fig. 4) that the pawl Q will remain in engagement therewith notwithstanding the lateral movement of the shaft O.

The drive-shaft E is further provided with cams S, adapted to engage periodically an arm T, rigidly secured to the shaft O. The arm T carries, by means of supports U, thread-guides V, of which there are as many as the clamp D carries grooves for the reception of the thread. A spring W is employed for keeping the arm T in engagement with the cams S.

The thread-guides V, as shown in Fig. 2, consist of a fixed part V', pivotally secured to one of the supports U, and a movable section V², pivotally secured to the other support V. The sections are pivotally connected to each other by means of a rim or ledge V³, projecting from the section V² and engaging a suitable recess in the section V'. Furthermore, a spring X is secured to one of the sections and engages the other section so as to press them closely together. On that side which is nearest to the clamp D each thread-guide is provided in its section V' with an aperture V⁴, receiving the thread, as shown in Fig. 2. The thread then passes between the two sections, and where it leaves the same it is clamped between the ends of the sections, it being understood that the spring X forces said sections against the thread Y.

I prefer for the sake of simplicity of construction to make all the upper portions of the thread-guides integral, likewise to form all the lower sections out of one piece, as shown. It will be seen in Fig. 4 that the front ends of the thread-guides are pointed like needles and spaced from each other, so that the points of the needles, to be described hereinafter, can project between the points of the thread-guides, as shown.

At the front end of the machine are arranged the bars or needles Z, having points and eyes at both ends. The front ends of the needles rest on a series of rollers $a$, loosely mounted on a transverse shaft $b$, and the rear ends of the needles are supported on a stationary block $c$, which is provided with pins $c'$, adapted to enter the eyes of the needles. A removable block $d$ fits over the needles above the block $c$, said block being secured in a movable member $e$, which at its front end $e'$ takes under a nose $f$, provided on the stationary part of the frame. A spring $g$ presses the end $e'$ upward, so as to hold the member $e$ down and in engagement with the needles, allowing, however, the said member to be raised for the purpose of removing the needles, as may be required, according to the operation described hereinafter.

It will be understood by reference to Fig. 6 that when the rear end of the member $e$ is raised the front end $e'$, owing to its engagement with the nose $f$, will move downward and compress the spring $g$. Said spring therefore has a tendency to normally hold the member $e$ down to engage the needles.

The removable member $e$ also carries the mechanism for advancing the meshes formed around the needles Z, said mechanism being constructed as follows: On the drive-shaft E is mounted a pulley $h$, which through the medium of a driving-belt $i$ imparts motion to a pulley $j$ on a shaft $k$. From said shaft a rotary motion is transmitted to a parallel upper shaft $l$ by means of a connecting-link $m$, which is secured to the pulley $j$ and to a disk on the shaft $l$. Said disk carries two projections $o$, which are adapted to engage a lug $p$, secured to a slide $q$, mounted to reciprocate longitudinally of the frame of the machine.

To the slide $q$ is pivotally connected an arm $r$, the free end whereof is secured to a stud or shaft $s$, mounted to slide in a curved guide $t$. The shaft is pressed downward by means of a spring $u$, held in said guide. The shaft carries an arm $v$, which is adapted to feed forward the mesh-advancing bars, as hereinafter described, and from the shaft further depends a loose pawl $w$, (see Fig. 11,) adapted to engage arms $x$ on a shaft $y$, journaled in the frame of the machine. On the same shaft $y$ are secured longer arms $z$, by means of which the mesh-feeding bars are brought into an operative position, as fully described hereinafter.

The mesh-feeding apparatus consists of the following parts: The member $e$ carries a casing 1, provided with an upper guideway 2 and a lower guideway 3, said guideways being preferably of dovetail formation. In the upper guideway 2 and adapted to slide rearward are a series of mesh-advancing bars 4, provided with points 4ª, directed downward. The said bars are pushed rearward by means of spring-pressed plungers or followers 5. At the rear end of the casing 1 is a passage of approximately the exact thickness of one of the bars 4, so that at the said end of the casing 1 one of the bars may pass from the upper guideway 2 to the lower guideway 3. The lower guideway is in such relation to the needles Z that the points of the bars 4 will project between the needles, as shown in Fig. 8. In the lower guideway and at the rear end thereof when the operation is started is arranged a bar 6, provided with pins or points directed upwardly and adapted to receive the threads Y.

The operation of the machine is as follows: At first all the bars are in the upper guideway 2 and only the bar 6 is in the lower guideway 3 at the rear end thereof, the clamp D being in position shown in Fig. 1. The upper section of the clamp is then removed, and a continuous thread Y is laid by passing it first through one of the sockets of the lower clamp-section and then forwardly through one of the thread-guides V, and from thence the thread is passed around one of the pins of the bar 6, being then returned through another thread-guide V to the second socket of the clamp D, and thus back and forth until all the sockets of the clamp D and all the passages of the thread-guides V have been filled. The upper section of the clamp D is then secured in place, so that the threads cannot change their position. Motion is then imparted to the drive-shaft E, causing the thread-guides V to be moved up and down and below the plane of the needles Z by means of the cams S. A lateral movement is also imparted to the thread-guides V by means of the cam-grooves H', so that the threads are laid around the needles, for instance, as illustrated in Fig. 3, it being understood that the pattern of the weave depends on the formation of the cam-grooves H'. When one row of meshes has thus been formed by the thread-guides having returned to their original position, the arm $v$ is moved forward through the medium of the connecting-rod $r$, so as to move the bar 6 forward a sufficient distance for the reception in the lower guideway 3 of the first mesh-feeding bar 4. When the connecting-bar $r$ moves upward, the pawl $w$ engages one of the arms $x$, turning the shaft $y$ sufficiently to force the rearmost bar 4 down to the lower guideway 3, so that said bar will be behind the row of the meshes first formed. A second row of meshes is then produced in the same manner in the rear of the lowered bar 4, and this second row of meshes is advanced in a like manner by lowering a second bar 4 and feeding the same forward through the medium of the bar $v$. At the same time the bars 4 are advanced the clamp D is also moved forward as the chains C are intermittently operated by means of the pawl Q and ratchet-wheel R. The operation is interrupted when the clamp D arrives at the rear end of the thread-guides V.

The fabric thus produced consists of a series of meshes arranged in rows and all connected to each other, since the thread Y is continuous, said meshes being held on the bars or needles Z. The completion of the hammock or hammock fabric is accomplished manually as follows:

The operator passes a separate thread through the rear eye of the last bar or needle Z and then raises the member $e$, so that he may remove the said threaded needle. The needle, with the thread attached thereto, is then drawn forward through all the meshes, so as to place the thread in the same position as the said needle was before. The end of the separate thread is then transferred from the first needle, which is laid aside, to the front eye of the second needle. The member $e$ is again raised and the second needle is drawn with its thread rearwardly through all of the meshes, so as to place the thread in the position formerly occupied by the second needle. The operation is then continued, gradually substituting longitudinal threads for all of the needles or bars Z. The end loops of the said longitudinal threads may be connected in any approved manner so as to form a complete hammock.

It will be seen that various patterns may be produced on the improved machine by using cylinders H, provided with cam-grooves H' of different shapes. A fabric of a practically unlimited length may be obtained, it being understood that there are used as many mesh-feeding bars 4 as the complete fabric has rows of meshes.

In Figs. 13, 14, and 15 I have shown another construction of the mesh-advancing mechanism, which construction I prefer to employ in some cases. According to said construction the drive-shaft E is provided with a disk 7, having projections or cams $7^a$, adapted to engage a stud $8^a$, projected from a reciprocating bar 8. Said bar is mounted to slide longitudinally in the guide or casing 9 and is pressed rearwardly by a spring 10. The bar 8 is adapted to impart a rocking motion to a lever 11, fulcrumed at $11^a$ and pivotally connected to a connecting-rod $r'$. This rod is secured to the shaft $s'$, adapted to move in a curved guide $t'$ and carrying an arm or projection $v'$, adapted to move the mesh-advancing bars 4 forwardly in the same manner as hereinbefore described. The shaft $s'$ further carries a projection $s^2$, which is adapted to engage arms $x'$, projecting from a chain $x^2$, which is conducted over sprocket-wheels 12. The arms $x'$ and the chain $x^2$ are so arranged that when one of the arms is engaged by the projection $s^2$ during the upward movement of the shaft $s'$ another projection $x'$ will move vertically downward, engaging one of the mesh-advancing bars 4 and transferring the same from the upper guideway 2 to the lower guideway 3, as clearly shown in Fig. 15.

I desire it to be understood that various modifications may be made without departing from the nature of my invention as set forth in the appended claims.

Having thus described my invention, I claim as new and desire to secure by Letters Patent—

1. A machine for making hammocks and the like, comprising a series of stationary bars or needles adapted to receive the meshes of the fabric, movable thread-guides constructed to place the thread around the said bars or needles, means for operating said guides, a clamp or holder adapted to secure one end of the fabric, means for moving said clamp toward the thread-guides, and mesh-advancing mechanism for periodically feeding the meshes along the needles or bars after each operation of the thread-guides, substantially as described.

2. A machine for making hammocks and the like, comprising stationary bars or needles, thread-guides movable up and down and also capable of lateral movement, a clamp for receiving one end of the fabric, means for moving said clamp toward the thread-guides, means for imparting an up-and-down and a lateral motion to the thread-guides, and a mesh-advancing device consisting of toothed bars adapted to slide longitudinally of the needles and to engage the meshes formed thereon, and means for operating said mesh-advancing device, substantially as described.

3. In a machine for making hammocks, the combination with the needles, movable thread-guides arranged to form meshes around the needles, a mesh-advancing device, a conveyer or chain movable longitudinally of the machine, a clamp carried by said conveyer and adapted to hold one end of the fabric, and means for operating the mesh-advancing device, the thread-guides and the conveyer, substantially as described.

4. In a machine for making hammocks, the combination with the needles, the mesh-advancing device arranged to feed the fabric along the needles, and the conveyer carrying a holder adapted to receive the opposite end of the fabric, of the thread-guides arranged intermediately of said holder and of the mesh-advancing device, said thread-guides being movable up and down whereby their ends will be alternately above and below the needles, the thread-guides being also movable laterally whereby the thread is carried over different needles, and means for operating the mesh-advancing device, the thread-guides and the conveyer, substantially as described.

5. In a machine for making hammocks and the like, a thread-guide consisting of two sections loosely connected, one of the sections being provided at one end with an inlet for the thread, and each section being provided at the other end with a groove forming an outlet for the thread, and a spring for forcing the sections against the thread at the outlet, substantially as described.

6. In a machine for making hammocks, the combination with the needles, movable thread-guides, means for operating the same, the conveyer, the holder carried thereby and means for actuating the conveyer, of a mesh-advancing device comprising two superposed longitudinal guideways having a connecting-passage at that end adjacent to the thread-guides, toothed mesh-advancing bars held to slide in said guideways, means for moving the mesh-advancing bars rearward in the upper guideway, means for successively transferring the said bars from the upper guideway to the lower guideway, so as to bring them into operative relation to the needles and to the meshes thereon, and mechanism for feeding the mesh-advancing bars forward in the lower guideway, substantially as described.

7. In a machine for making hammocks, the combination with the needles, movable thread-guides, means for operating the same, the conveyer, the holder carried thereby and means for actuating the conveyer, of a mesh-advancing device comprising two superposed longitudinal guideways having a connecting-passage at that end adjacent to the thread-guides, toothed mesh-advancing bars held to slide in said guideways, a spring-pressed follower for moving said bars rearwardly in the upper guideway, downwardly-moving arms for transferring the said bars from the upper guideway to the lower guideway, and a sliding arm for moving the said bars forward in the lower guideway, substantially as described.

8. In a machine for making hammocks, the combination with the needles, movable thread-guides, means for operating the same, the conveyer, the holder carried thereby and means for actuating the conveyer, of a mesh-advancing device comprising two superposed longitudinal guideways having a connecting-passage at that end adjacent to the thread-guides, toothed mesh-advancing bars held to slide in the said guideways, a spring-pressed follower for moving the bars rearward in the upper guideway, a chain arranged vertically adjacent to the said passage and provided with projections adapted to transfer the said mesh-advancing bars from the upper guideway to the lower guideway, a sliding bar constructed to feed the said mesh-advancing bars forward in the lower guideway, and a projection on the said sliding bar adapted to engage the projections or arms on the chain to actuate said chain, substantially as described.

9. In a machine for making hammocks and the like, a series of stationary bars or needles, a support for said needles, provided with pins adapted to project through the eyes of the needles, wheels adapted to support the needles at their other ends, mechanism for feeding the material forward and placing it around the needles in meshes, and mesh-advancing bars engaging the needles from above and provided with teeth or projections extending between the said supporting-wheels, substantially as described.

10. In a machine for weaving hammocks and the like, the combination of the stationary needles having eyes at each end, and mechanism for weaving the material on said needles, of a needle support or holder consisting of two sections between which the needles are held and clamped, the sections being movable relatively to each other so that they can be separated for the purpose of removing any one of the needles, substantially as described.

11. In a machine for making hammocks and the like, the combination of the needles, the supporting-block engaging one end of the needles, a support for the other end of the needles, an upper section or member loosely placed on the upper surface of the needles, means for normally pressing said upper section downward, mechanism for feeding the thread or like material forward and placing it in meshes around the needles, mesh-advancing devices carried by the said upper section and adapted to engage the needles from above, and means for moving the mesh-advancing devices forward, substantially as described.

IGNACIO BASULTO.

Witnesses:
A. A. HOPKINS,
A. M. MOLINO.